June 19, 1956   D. L. KAUFMAN   2,750,760
REFRIGERATING APPARATUS
Filed April 19, 1952   2 Sheets-Sheet 1

INVENTOR.
Daniel L. Kaufman
BY
Willits, Hardman & Fehr.

June 19, 1956     D. L. KAUFMAN     2,750,760

REFRIGERATING APPARATUS

Filed April 19, 1952     2 Sheets-Sheet 2

INVENTOR.
Daniel L. Kaufman

United States Patent Office 2,750,760
Patented June 19, 1956

2,750,760

REFRIGERATING APPARATUS

Daniel L. Kaufman, Dayton, Ohio, assignor to General Motors Corporation, Dayton, Ohio, a corporation of Delaware Application April 19, 1952, Serial No. 283,211

2 Claims. (Cl. 62—117.1)

This invention relates to refrigerating apparatus and more particularly to an air conditioning unit for an automobile or the like.

Experience shows that refrigeration systems which are completely sealed at the factory give exceptionally long trouble-free service whereas refrigeration systems which are assembled by servicemen out in the field are more inclined to give trouble due to the critical nature of the refrigerant charge and due to the trouble caused by dust, moisture and other impurities which may enter the refrigerant circuit during shipment and subsequent assembly in the field. It is an object of this invention to provide an air conditioning system for an automobile which may be installed in the field and which has many of the advantages of systems sealed at the factory.

One of the problems in equipping a passenger automobile with air conditioning equipment which is not a problem in most other installations is that of constructing and arranging the parts so that they will not unduly interfere with the servicing and repair of the automobile. Since automobile air conditioning equipment is frequently installed and serviced by garage mechanics rather than by refrigeration servicemen, another problem is that of protecting the refrigerant circuit from the loss of refrigerant or the entrance of impurities into the system before and during installation as well as when for any reason it becomes necessary to disconnect the refrigerant compressor from the rest of the system. It is an object of this invention to so construct and arrange the parts that the compressor may readily be installed, removed, or repaired by a garage mechanic.

More particularly it is an object of this invention to provide automatic shut-off valves at the inlets and outlets to the refrigerant compressor which are constructed and arranged so that removal of the compressor automatically seals off the compressor so as to prevent the escape of the refrigerant charge therefrom, and so as to prevent the introduction of moisture and other impurities into the compressor housing.

Further objects and advantages of the present invention will be apparent from the following description, reference being had to the accompanying drawings, wherein a preferred form of the present invention is clearly shown.

Figure 1:
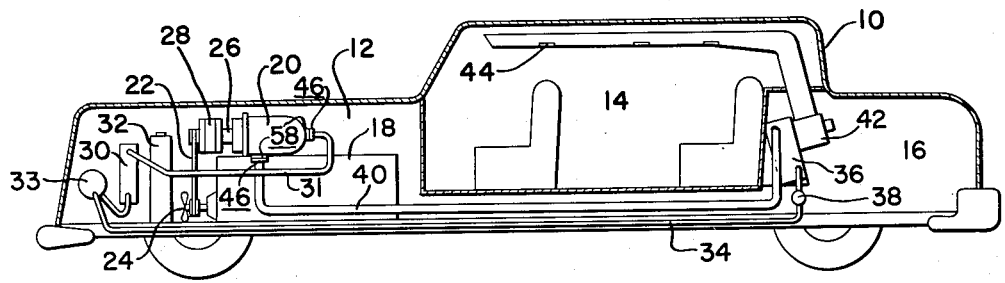
Figure 1 is a schematic elevational view partly in section showing the invention applied to a conventional passenger automobile.

Referring now to the drawings wherein a preferred embodiment of the invention has been disclosed, reference numeral 10 generally designates a conventional passenger automobile having an engine compartment 12, a passenger compartment 14, and a luggage compartment 16. Reference numeral 18 designates the main car engine which not only supplies power for operating the car but also supplies power for operating the refrigerant compressor 20 which is located directly in the engine compartment 12. For purposes of illustration, the compressor has been shown driven by means of a belt 22 which drivingly connects the main engine crankshaft 24 to the compressor drive shaft 26 through a clutch 28, whereas other types of drives could be used. In a system of this type it is standard practice to mount the compressor directly in the engine compartment and this being the case, it frequently becomes necessary to disconnect and remove the compressor in order to overhaul or service the main car engine.

The air conditioning system includes an air cooled condenser 30 located in front of the main engine radiator 32 so as to be cooled by the air entering the engine compartment. A line 31 connects the discharge side of the compressor 20 to the condenser 30. The condensed refrigerant flows from the condenser 30 into a receiver 33 from which it flows through a refrigerant line 34 which leads to the evaporator 36 located in the luggage or trunk compartment of the car. The flow of refrigerant from the receiver 33 to the evaporator 36 may be controlled by any conventional means such as the thermostatic expansion valve 38. The evaporated refrigerant flows from the evaporator 36 to the compressor 20 through the suction line 40. A blower 42 circulates air to be conditioned over the evaporator and discharges it into the passenger compartment through a louvered duct 44. Any other suitable air distributing means may be used without departing from the spirit of my invention.

Figure 5:
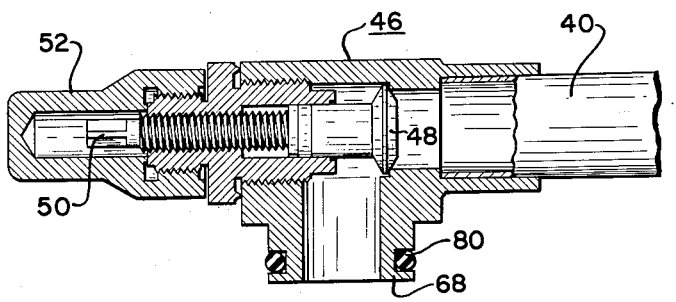
Figure 5 is a sectional view showing a manually operably shut-off valve which attaches to the refrigerant line where it connects to the compressor.

Since it becomes necessary for garage mechanics to install and service the air conditioning equipment as well as the main car engine, it is highly desirable to protect the refrigerant circuit from loss of refrigerant and from the introduction of impurities into the circuit when the compressor is installed or removed from the system. In order to provide the above protection, the suction or return line 40, which connects the evaporator to the inlet of the compressor is provided with a fitting 46 (see Figures 2, 3 and 5) at that end which is adapted to be connected to the compressor. A similar fitting has been provided at the point where the discharge line 31 connects to the outlet of the compressor. Since these fittings are similar in construction and operation, only the one will be described and the same reference numerals will be used to designate corresponding parts of both of these fittings. The fitting which is attached to the line 40, for example, includes a manually operable shut-off valve 48, which, when closed as shown in Figure 5, prevents the escape of refrigerant from the line 40 whenever the valve 48 is closed. The valve 48 is a conventional shut-off valve having an operating stem 50 which is normally concealed by means of a protective cap 52 so as to discourage tampering with the valve by the car owner. The fitting 46 is adapted to be bolted or otherwise secured to a complementary fitting 58 (see Figure 3) carried directly by the compressor housing 60 at the point where the refrigerant enters the inlet of the compressor. Two of the fittings 58 are provided as shown. The one is at the inlet to the compressor and the other is at the outlet of the compressor. Each fitting 46 and its associated fitting 58 may be termed a quick detachable two piece adapter. Any conventional type of compressor may be used and for that reason the details of the compressor per se have not been shown. For a description of the compressor per se reference is hereby made to Smith application 243,799, filed August 27, 1951.

Figure 4:
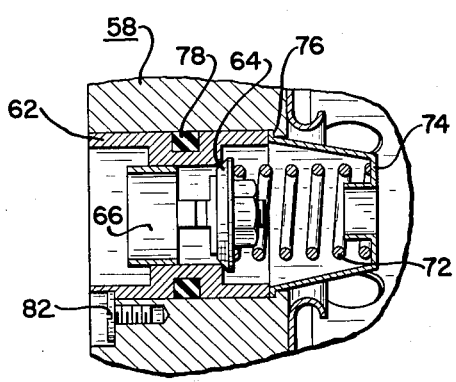
Figure 4 is a fragmentary sectional view showing one of the shut-off valves in the closed position.
Figure 3:
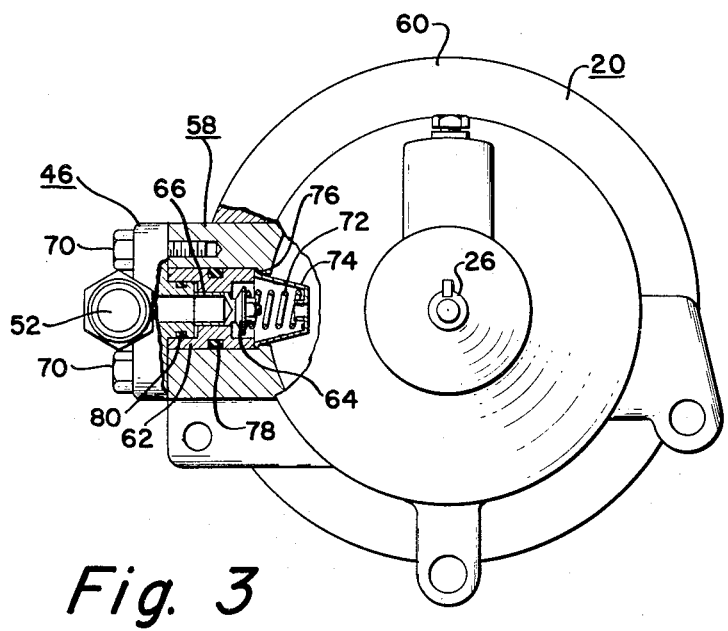
Figure 3 is an end view with parts broken away of the same compressor shown in Figure 2.

Each fitting 58 is provided with an insert 62 which slidably supports a valve 64. The valve 64 is provided with an operating extension 66 which is adapted to be engaged by the projection 68 on the refrigerant line supported fitting 46 so as to move the valve to the open position when the fitting 46 is in place. Figure 3 shows one of the valves 64 in the open position whereas Figure 4 shows one of the valves in its closed position. For the reasons pointed out hereinabove, only the one set of disconnect fittings has been described in detail although both have been shown in the drawing and the same reference numerals have been used for designating like or similar parts of the two sets of disconnect fittings and valves. In each case, the one fitting element 58 is welded or otherwise secured within an opening in the compressor housing 60 and the other fitting element 46 is carried directly by one of the refrigerant lines communicating with the compressor.

Figure 2:
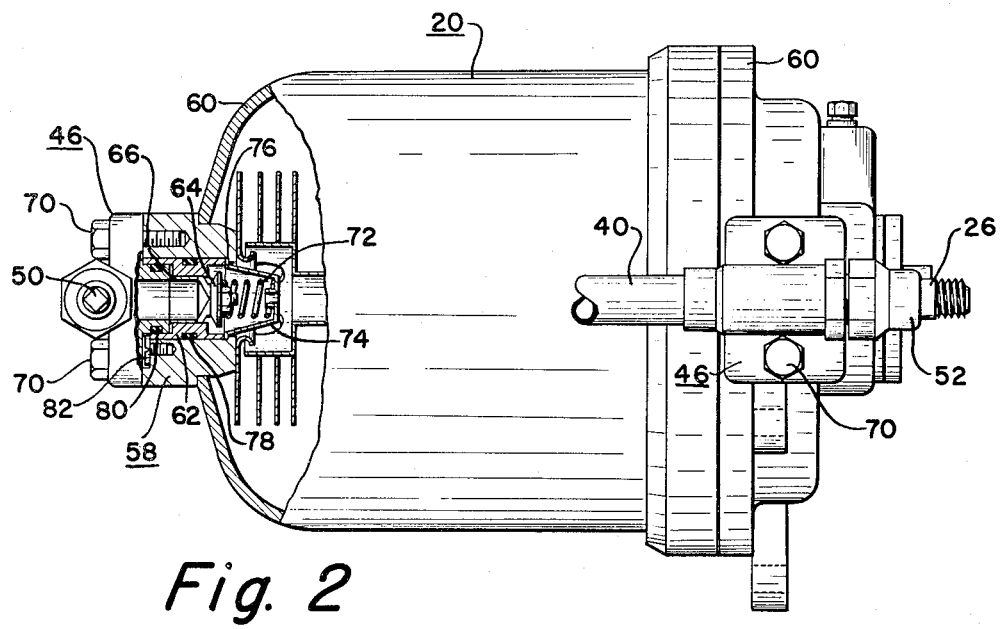
Figure 2 is an elevational view with parts broken away showing a compressor constructed in accordance with the invention.

For purposes of illustration, each fitting 46 has been shown secured to the associated fitting 58 by means of cap screws 70. Referring now to Figures 2 and 4, it will be seen that a coil spring 72 biases the valve 64 towards the closed position so that upon removal of the fitting 46 the valve 64 will automatically move from the open position shown in Figure 2 to the closed position shown in Figure 4 before any appreciable quantity of refrigerant has been lost. A spring retainer 74 which is provided with a flange 76 is clamped in place between the insert 62 and a shoulder provided on the fitting 58. An O-ring type of seal 78 is provided as shown for preventing the leakage of any refrigerant between the fitting 58 and the insert 62. A similar O-ring type of seal 80 prevents the escape of refrigerant through the joint between the fitting 46 and the insert 62. The insert 62 is held in assembled relationship by means of one or more screws 82.

It will be noted that upon removal of the fitting 46 and the screws 82, it is possible to remove and replace the elements 62, 64, 72, 74, without dismantling the entire compressor. The main body of each of the fittings 58 is brazed or otherwise secured to the compressor housing 60 so as to be integral therewith.

By virtue of the above described construction it is obvious that the compressor may readily be removed from the refrigerant circuit without the loss of any appreciable amount of refrigerant and without danger of admitting moisture or other impurities into the compressor housing 60 or the lines connected to the compressor.

While the form of embodiment of the invention as herein disclosed constitutes a preferred form, it is to be understood that other forms might be adopted, as may come within the scope of the claims which follow.

What is claimed is as follows:

1. In an air conditioning system for use in an automobile having an engine compartment, an engine in said engine compartment, a passenger compartment, and a luggage compartment; the combination, a compressor adapted to be removably mounted in the engine compartment, torque transmitting means for drivingly connecting said compressor to said engine, a condenser, an evaporator, refrigerant flow connections between said compressor, condenser and evaporator, said refrigerant flow connections including a suction line and a discharge line leading to and from the compressor respectively, a two piece adapter for removably connecting one of said lines to said compressor, a first one of said pieces being carried by said one line and including a valve for closing said line at said adapter, the second one of said pieces being carried by said compressor and including automatic valve means supported therein, said last named valve means including a valve element for automatically sealing the passage leading to the compressor in response to separation of said first piece from said second piece, and means for removably securing said first piece and the line connected thereto to said second piece.

2. In combination, an automobile having a passenger compartment, an engine compartment, and a luggage compartment, means for propelling said automobile including an engine disposed within said engine compartment, a refrigerant compressor disposed within said engine compartment, means for drivingly connecting said compressor to said engine, said compressor having an inlet and an outlet, a refrigerant condenser, a first conduit for connecting the outlet of said compressor to the inlet of said condenser, an evaporator, means for supplying liquid refrigerant from said condenser to said evaporator at a reduced pressure, a second conduit for conveying refrigerant vapor from said evaporator to the inlet of said compressor, each of said first and second conduits being connected to said compressor by means of a two part adapter, a first part of which is secured to the compressor and the other part of which is carried by one of said conduits, valve means in said second named part for sealing the inlet to the conduit, and means for closing the passage leading to the compressor upon disconnection of the conduit associated therewith so as to prevent entry of foreign matter into said compressor.

References Cited in the file of this patent

UNITED STATES PATENTS

| | | |
|---|---|---|
| 1,634,813 | Whitehead | July 5, 1927 |
| 1,703,311 | Litle | Feb. 26, 1929 |
| 2,254,997 | Fisher | Sept. 2, 1941 |
| 2,338,953 | Melke | Jan. 11, 1944 |
| 2,518,299 | Fernandez | Aug. 8, 1950 |
| 2,530,241 | Harrington | Nov. 14, 1950 |
| 2,534,273 | Kleist | Dec. 19, 1950 |
| 2,541,921 | Henny | Feb. 13, 1951 |